US012781865B2

(12) United States Patent
Bommineni et al.

(10) Patent No.: US 12,781,865 B2
(45) Date of Patent: Nov. 3, 2026

(54) POLYMERIC RUPTURE DISK SYSTEM

(71) Applicant: Donaldson Company, Inc., Bloomington, MN (US)

(72) Inventors: Suresh B. Bommineni, Shakopee, MN (US); James P. Moorman, Eden Prairie, MN (US); Shane B. Campbell, St. Paul, MN (US); Aflal Rahmathullah, Savage, MN (US)

(73) Assignee: Donaldson Company, Inc., Bloomington, MN (US)

( * ) Notice: Subject to any disclaimer, the term of this patent is extended or adjusted under 35 U.S.C. 154(b) by 7 days.

(21) Appl. No.: 18/883,341

(22) Filed: Sep. 12, 2024

(65) Prior Publication Data

US 2025/0003511 A1 Jan. 2, 2025

Related U.S. Application Data

(63) Continuation of application No. 17/729,758, filed on Apr. 26, 2022, now Pat. No. 12,092,232.
(Continued)

(51) Int. Cl.
*F16K 17/16* (2006.01)
*F16K 27/10* (2006.01)
(Continued)

(52) U.S. Cl.
CPC .............. *F16K 17/16* (2013.01); *F16K 27/10* (2013.01); *F16K 17/162* (2013.01); *F16K 17/40* (2013.01); *F16K 25/005* (2013.01)

(58) Field of Classification Search
CPC ........ F16K 17/16; F16K 17/162; F16K 17/40; F16K 25/005; F16K 27/10
(Continued)

(56) References Cited

U.S. PATENT DOCUMENTS

| | | |
|---|---|---|
| 2,353,254 A | 7/1944 | Mccandless |
| 2,576,431 A | 11/1951 | White |

(Continued)

FOREIGN PATENT DOCUMENTS

| | | |
|---|---|---|
| CA | 2016072 A1 | 11/1990 |
| CA | 2563661 C | 11/2010 |

(Continued)

OTHER PUBLICATIONS

ASTM International: "Standard Test Method for Air Permeability of Textile Fabrics," ASTM D737-18, Last Updated Jun. 28, 2023, pp. 1-5.

(Continued)

*Primary Examiner* — Minh Q Le
(74) *Attorney, Agent, or Firm* — Mueting Raasch Group

(57) ABSTRACT

A rupture disk system has a housing defining a central axis, a first axial end defining an axial opening and a second axial end. An airflow pathway extends from the first axial end facing towards the second axial end. A sealing surface is defined about the airflow pathway towards the first axial end. A shield extends across the airflow pathway on the second axial end. Radial openings are defined around the central axis, where the radial openings are positioned between the first and the second axial ends, such that the airflow pathway extends from the axial opening to the radial openings. A rupture disk is coupled to the housing across the airflow pathway. The rupture disk has a polymeric layer. The rupture disk has an unweakened region having a first thickness and a weakened region having a second thickness. A threshold rupture pressure is defined by the weakened region.

13 Claims, 3 Drawing Sheets

Related U.S. Application Data

(60) Provisional application No. 63/179,735, filed on Apr. 26, 2021.

(51) Int. Cl.
*F16K 17/40* (2006.01)
*F16K 25/00* (2006.01)

(58) Field of Classification Search
USPC ................................ 137/68.19, 68.23, 68.26
See application file for complete search history.

(56) References Cited

U.S. PATENT DOCUMENTS

| | | | | |
|---|---|---|---|---|
| 2,673,660 | A | 3/1954 | Nordin | |
| 2,701,075 | A | 2/1955 | Coffman | |
| 2,758,749 | A | 8/1956 | Evan | |
| 2,962,038 | A | 11/1960 | Bird | |
| 2,987,218 | A | 6/1961 | Erickson et al. | |
| 3,169,658 | A | 2/1965 | Porter | |
| 3,463,351 | A | 8/1969 | Mills | |
| 3,559,668 | A | 2/1971 | Crossman | |
| 3,775,189 | A * | 11/1973 | Jaggard | B29C 65/08 264/249 |
| 3,881,629 | A | 5/1975 | Shaw et al. | |
| 4,139,005 | A | 2/1979 | Dickey | |
| 4,245,749 | A | 1/1981 | Graves | |
| 4,479,587 | A | 10/1984 | Mundt et al. | |
| 4,549,565 | A | 10/1985 | Short, III | |
| 4,590,957 | A | 5/1986 | McFarlane | |
| 4,819,823 | A | 4/1989 | Kadakia et al. | |
| 4,905,722 | A | 3/1990 | Rooker et al. | |
| 5,002,085 | A | 3/1991 | Fitzgerald | |
| 5,368,180 | A | 11/1994 | Farwell et al. | |
| 5,377,716 | A | 1/1995 | Farwell et al. | |
| 5,632,505 | A | 5/1997 | Saccone et al. | |
| 6,251,083 | B1 | 6/2001 | Yum et al. | |
| 6,298,869 | B1 | 10/2001 | Strelow | |
| 7,975,714 | B2 | 7/2011 | Newman et al. | |
| 8,322,360 | B2 | 12/2012 | Wilson | |
| 8,674,260 | B2 | 3/2014 | Modena et al. | |
| 8,802,254 | B2 | 8/2014 | Lee | |
| 10,228,068 | B2 | 3/2019 | Goggin et al. | |
| 10,439,185 | B2 | 10/2019 | Fukuoka et al. | |
| 12,092,232 | B2 | 9/2024 | Bommineni et al. | |
| 2003/0155005 | A1 | 8/2003 | Siimes et al. | |
| 2004/0025936 | A1 | 2/2004 | Wadkins | |
| 2008/0060741 | A1 * | 3/2008 | Privitera | B32B 27/00 428/411.1 |
| 2010/0224603 | A1 | 9/2010 | Modena et al. | |
| 2010/0282330 | A1 | 11/2010 | Luther et al. | |
| 2010/0282331 | A1 | 11/2010 | Newman et al. | |
| 2012/0000548 | A1 | 1/2012 | Khamitkar | |
| 2013/0206673 | A1 | 8/2013 | Ying et al. | |
| 2014/0370336 | A1 | 12/2014 | Reitzle et al. | |
| 2016/0018014 | A1 | 1/2016 | Modena et al. | |
| 2018/0087717 | A1 | 3/2018 | Fischer et al. | |
| 2018/0345587 | A1 * | 12/2018 | Watts | B29C 65/78 |
| 2020/0263796 | A1 | 8/2020 | Veto et al. | |
| 2021/0293341 | A1 | 9/2021 | Avila Dias | |
| 2022/0341502 | A1 | 10/2022 | Bommineni et al. | |

FOREIGN PATENT DOCUMENTS

| | | | |
|---|---|---|---|
| DE | 202020101150 | U1 | 3/2020 |
| EP | 1363484 | A2 | 11/2003 |
| EP | 1591703 | A2 | 11/2005 |
| EP | 2187066 | A1 | 5/2010 |
| KR | 20180080528 | A | 7/2018 |

OTHER PUBLICATIONS

International Search Report and Written Opinion for International Application No. PCT/US2022/026355, mailed Aug. 10, 2022, 14 Pages.

* cited by examiner

POLYMERIC RUPTURE DISK SYSTEM

This application is a continuation of U.S. patent application Ser. No. 17/729,758, filed Apr. 26, 2022, which claims the benefit of U.S. Provisional Application No. 63/179,735, filed Apr. 26, 2021, the disclosures of which are incorporated by reference herein in their entireties.

TECHNOLOGICAL FIELD

The present disclosure is generally related to rupture disks. More particularly, the present disclosure is related to rupture disk assemblies.

BACKGROUND

Rupture disks are used in a variety of industries to equalize pressure between a sealed environment and an outside environment upon a pressure differential that exceeds a threshold. Rupture disks are typically installed on an enclosure to form a sealed connection. Upon experiencing the requisite pressure differential, the rupture disk will burst to allow airflow between the enclosure and the outside environment. Various types of rupture disks are constructed of a polymeric layer that is selectively thinned, such as through etching or lasing operations, to create the lines of weakness across the layer that fail at the desired pressure differential. However, such manufacturing operations can be relatively expensive due to, at least in part, the level of precision required. Furthermore, the environment within which a rupture disk is intended to be used can present design challenges. For example, lower threshold rupture pressure can become more difficult to achieve as the size of the rupture disk decreases. As another example, in environments where the differential pressure cycles regularly, the rupture disk must be relatively durable so that the threshold rupture pressure does not decrease over time.

SUMMARY

Some embodiments of the technology disclosed herein relate to a rupture disk system having a housing defining a central axis. The housing has a first axial end defining an axial opening and a second axial end. An airflow pathway extends from the first axial end towards the second axial end. A sealing surface is disposed about the airflow pathway facing towards the first axial end. A shield extends across the airflow pathway on the second axial end. Radial openings are defined around the central axis, where the radial openings are positioned between the first axial end and the second axial end such that the airflow pathway extends from the axial opening to the radial openings. A rupture disk is coupled to the housing across the airflow pathway. The rupture disk has a polymeric layer. The rupture disk has an unweakened region having a first thickness and a weakened region having a second thickness, where the rupture disk has a threshold rupture pressure defined by the weakened region.

In some such embodiments the polymeric layer is breathable. Additionally or alternatively, the polymeric layer is non-breathable. Additionally or alternatively, the polymeric layer has polytetrafluoroethylene (PTFE). Additionally or alternatively, the rupture disk has a first thickness from 0.5 mils (12.7 μm) to 10 mils (254 μm). Additionally or alternatively, the rupture disk further has a support layer coupled to the housing across the airflow pathway, the support layer abutting the polymeric layer. Additionally or alternatively, the support layer is a molded plastic. Additionally or alternatively, the support layer is domed. Additionally or alternatively, the polymeric layer has a carrier layer and a first adhesive disposed across a first surface of the carrier layer, where the first adhesive is coupled to the housing. Additionally or alternatively, the polymeric layer is heat welded to the housing in a perimeter region of the polymeric layer.

Additionally or alternatively, the weakened region in the polymeric layer separates two distinct areas in the polymeric layer. Additionally or alternatively, the rupture disk has an outer dimension of less than 50 mm. Additionally or alternatively, the polymeric layer has a perimeter region and a central region, the perimeter region having an adhesive layer disposed across a second surface of the carrier layer, where the central region lacks the second adhesive layer. Additionally or alternatively, the polymeric layer includes polyethersulfone (PES). Additionally or alternatively, the polymeric layer is skived PTFE. Additionally or alternatively, the rupture disk has a first thickness ranging from 0.5 mils (12.7 μm) to 3 mils (76.2 μm). Additionally or alternatively, the shield is spaced no more than 10 mm from the rupture disk in an axial direction.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

Figure 1:
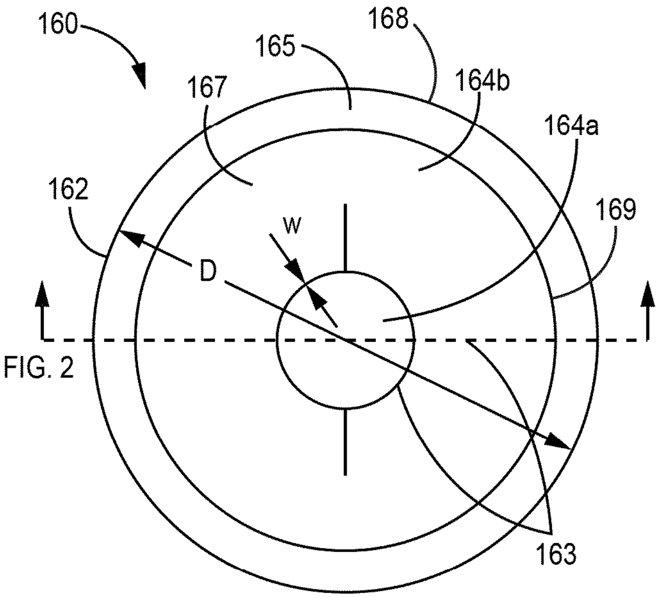
FIG. 1 depicts facing view of an example rupture disk consistent with various embodiments.
Figure 2:
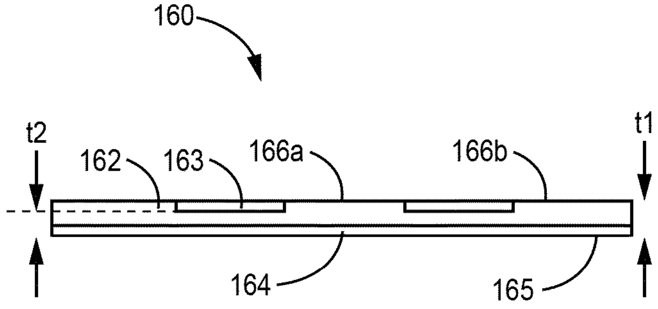
FIG. 2 is a cross-sectional view of the example rupture disk of FIG. 1.

FIG. 1 is a facing view of an example rupture disk 160 consistent with various embodiments. FIG. 2 is an example cross-sectional view consistent with the rupture disk 160 depicted in FIG. 1. The rupture disk 160 is generally configured to rupture at a particular threshold rupture pressure to allow for pressure equalization. The term "threshold rupture pressure" is the minimum pressure differential across the rupture disk 160 that causes rupturing of the rupture disk 160. The threshold rupture pressure can be specific to a particular temperature or temperature range. The rupture disk 160 generally has a polymeric layer 162.

In some embodiments, the rupture disk 160 has a first thickness t1 ranging from 0.5 mils (12.7 μm) to 10 mils (254 μm). In some embodiments, the rupture disk 160 has a first thickness t1 ranging from 1 mil (25.4 μm) to 5 mils (127 μm). In some particular embodiments, the rupture disk 160 has a first thickness t1 ranging from 0.5 mil (12.7 μm) to 3 mil (76.2 μm). The rupture disk 160 also defines a weakened region 163 having a second thickness t2. The weakened region 163 is a region where the thickness of the rupture disk 160 is reduced. In various implementations, the weakened region 163 defines the threshold rupture pressure of the rupture disk 160. In various embodiments, the introduction of a weakened region 163 advantageously lowers the threshold rupture pressure of the rupture disk 160. The weakened region 163 can have various configurations. Generally, the weakened region 163 has a width w (see FIG. 1) of less than 300 μm. In some embodiments the weakened region 163 has a width w of at least 1 μm. The weakened region 163 can have a width w of less than 600p m. In some embodiments, the weakened region 163 has a width w from 20 μm to 50 μm. The weakened region 163 can have a width w from 100 μm-200 μm, 125 μm-175 μm, or 450 μm-550 μm.

The thickness of the rupture disk 160 in the weakened region 163 (the weakened region having the second thickness t2) is generally less than the thickness of the rupture disk 160 in the un-weakened regions (the un-weakened regions having the first thickness t1). In some embodiments the second thickness t2 is under 75% of the first thickness t1 of the rupture disk 160 in the un-weakened regions. In some embodiments the second thickness t2 of the rupture disk 160 is 50% or less than the first thickness t1 of the rupture disk 160.

The polymeric layer 162 is generally continuous. "Continuous" is defined herein as forming an uninterrupted layer across its width and length that lacks openings. In various embodiments, the weakened region 163 is defined by areas where the polymeric layer 162 has been thinned. The polymeric layer 162 can be thinned through a variety of approaches such as lasing operations, etching, compression, kiss cutting, and the like.

The polymeric layer 162 can be constructed of a variety of different materials and combinations of materials. In a variety of implementations, it can be desirable to use a polymer that is resistant to corrosion in the intended operating environment of the rupture disk. In a variety of implementations, it is desirable to use a polymer to construct the polymeric layer 162 that has a high fatigue resistance and durability to prevent premature failure in response to environmental pressure differential cycles over the course of its useful life. In some embodiments the polymer is polytetrafluoroethylene (PTFE). In some such embodiments the polymer is a breathable PTFE, such as an expanded PTFE. In some other embodiments the polymer is a non-breathable PTFE, such as an unexpanded PTFE. In some embodiments the PTFE is skived PTFE. Skived PTFE may advantageously have a lower threshold rupture pressure than some other materials. In some embodiments the PTFE is cast PTFE. In some embodiments the polymeric layer is constructed of a breathable or non-breathable polyethersulfone (PES). "Non-breathable" is used herein to mean that there is no measurable airflow through the component/layer at room temperature with at a 20 mbar (0.29 psi) pressure differential as measured in accordance with ASTM D737-18. In various embodiments the polymer is liquid impermeable.

In some embodiments, the Frazier air permeability, measured according to ASTM D737-18, entitled "Test Method for Air Permeability of Textile Fabrics," of the rupture disk 160 and/or the polymeric layer 162 can range from 0 to 3 CFM ($ft^3$/min) at a pressure drop of 0.5 inches $H_2O$ (0.018 psi). In some embodiments the rupture disk 160 and/or the polymeric layer 162 can have a water entry pressure of 2 psi to 60 psi. The material forming the rupture disk 160 and/or the polymeric layer 162, before weakening to form the rupture disk 160, can have a tensile strength in the machine direction ranging from 0.5 lbf/in to 7 lbf/in, 1 lbf/in to 6 lbf/in, or 1 lbf/in to 5 lbf/in. Prior to forming the weakened region 163, the material forming the rupture disk 160 and/or the polymeric layer 162 can have an elongation above 50%, in some embodiments. In some other embodiments the material forming the rupture disk 160 and/or the polymeric layer 162, prior to forming the weakened region 163, can have an elongation that is less than 50%. The material forming the rupture disk 160 and/or the polymeric layer 162, prior to forming the weakened region 163, can have an elongation that is generally greater than 5%. In some embodiments the material forming the rupture disk 160 and/or the polymeric layer 162, prior to forming the weakened region, can have an elongation that ranges from 10% to 25%.

In various embodiments the polymer is resistant to liquid flow therethrough. In some embodiments, one or more functional coatings can be applied to the rupture disk 160 or the polymeric layer 162. For example, an oleophobic coating can be applied to one or both sides of the rupture disk 160 and/or the polymeric layer 162. In some embodiments a hydrophobic coating can be applied to one or both sides of the rupture disk 160 and/or the polymeric layer 162.

In some embodiments the rupture disk 160 can have a support layer 164. The support layer 164 can be substantially coextensive with the polymeric layer 162, in some embodiments. The support layer 164 is generally disposed across a surface of the polymeric layer 162 and defines a particular thickness perpendicular to the surface of the polymeric layer 162. In various embodiments, the support layer 164 is configured to have a constant thickness across the polymeric layer 162. The support layer 164 can be constructed of a variety of materials and combinations of materials.

In some embodiments, the support layer 164 is a coating deposited on the polymeric layer 162. The coating can be applied in a liquid state and then cured through curing operations known in the art. In some embodiments, the support layer 164 is a distinct layer of material that is adhered or otherwise laminated to the polymeric layer 162. The support layer 164 can be a scrim layer. The support layer 164 can be a metal layer, such as a metal foil layer. In some examples the support layer 164 can have a first adhesive layer on a first side that is coupled to the polymeric layer 162. In some such embodiments, the adhesive layer can directly couple to each of the support layer 164 and the polymeric layer 162. In some other embodiments, the support layer 164 can have a carrier layer and the first adhesive layer is disposed across a first surface of the carrier layer. The first adhesive layer is coupled to a surface of the polymeric layer 162. The carrier layer is a plastic film, in various embodiments. It will be appreciated that various embodiments of rupture disks do not have a support layer, however.

In various embodiments, such as the one depicted, the weakened region 163 defines two distinct areas 166*a*, 166*b*, meaning that the areas are separated from each other by the weakened region 163, which is visible in FIG. 1. In this example, the weakened region 163 defines a circle and a first area 166*a* is within the circle, and a second area 166*b* is outside the circle. The weakened region 163 can define shapes alternate to or in addition to a circle such as polygonal shapes, ovals, and the like. In various embodiments, such as the one depicted, the weakened region 163 separates portions of a single area. In the current example, the weakened region 163 defines a plurality of radial extensions that each separate portions of the second polymeric area.

Figure 3:
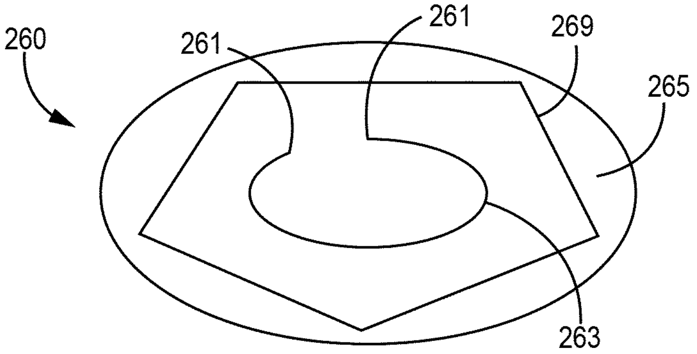
FIG. 3 is a perspective view of another example rupture disk consistent with some embodiments.
Figure 7A:
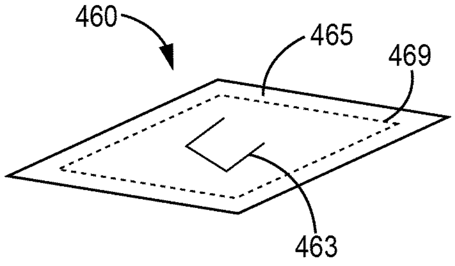
FIG. 7A depicts a perspective view of yet another example rupture disk consistent with some embodiments.
Figure 7B:
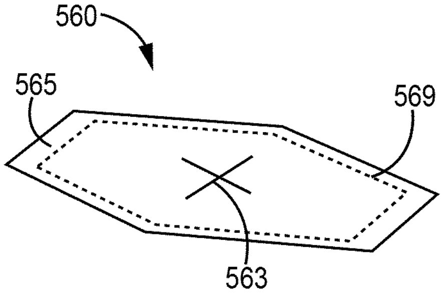
FIG. 7B depicts a perspective view of yet another example rupture disk consistent with some embodiments.

FIG. 3 is a perspective view of another example rupture disk 260 consistent with embodiments. In the current example, the rupture disk 260 has a weakened region 263 that does not separate the rupture disk 260 into discrete areas. Rather, the weakened region 263 forms a circular flap having two discrete endpoints 261. In this example the weakened region 263 forms a portion of a circle rather than a complete circle. FIGS. 7A and 7B each depict a perspective view of alternate example rupture disks 460, 560 where the weakened regions 463, 563 have alternate shapes. In FIG. 7A the weakened region 463 has three linear segments joined at corners to form three sides of a rectangular shape. FIG. 7B depicts a rupture disk 560 having a weakened region 563 that forms a cross shape, where two linear segments intersect at their midpoints. FIGS. 7A and 7B will be discussed in more detail below and will generally be consistent with the descriptions of FIGS. 1-3, except where differences are explicitly described or depicted. The weakened region can have other shapes, however, such as a polygonal shape or an ovular shape.

The facing surfaces of rupture disks consistent with the technology disclosed herein can have a variety of different shapes. In the examples of FIGS. 1 and 3, the rupture disks have a circular shape. In some embodiments the rupture disk can define an ovular shape. In the example of FIG. 7A, the facing surfaces of the rupture disk 460 has a rectangular shape. In the example of FIG. 7B, the facing surfaces of the rupture disk 560 has a hexagonal shape. In various embodiments where the rupture disk has a polygonal shape, the corners can be rounded corners.

Returning to the discussion of FIGS. 1 and 2, in various embodiments, the rupture disk 160 is configured to couple to a housing or enclosure. For example, a surface of the rupture disk 160 can be configured to be coupled to a housing about an opening. More particularly, the rupture disk 160 can define a perimeter region 165 and a central region 167 (FIG. 1), where the perimeter region 165 is configured to be welded or otherwise adhered to a housing about an opening. In some examples, an adhesive defines the perimeter region 165 on one side of the rupture disk 160 that is configured to be coupled to the housing. More particularly, the perimeter region 165 of the carrier layer can have the second adhesive disposed thereon. In such embodiments, the central region 167 of the rupture disk 160 lacks the adhesive layer. In some other embodiments, the adhesive layer extends across the perimeter region 165 and the central region 167 of the rupture disk 160. In some such embodiments, a protective layer is disposed over the adhesive layer located within the central region 167 to obstruct the second adhesive layer. Prior to installation of the rupture disk to a housing, a removable liner can be coupled to the adhesive located in the perimeter region 165, where the removable liner is configured to be removed from the second adhesive to allow adherence of the rupture disk 160 to the housing. In some embodiments, the perimeter region 165 lacks an adhesive layer. In such configurations the perimeter region 165 of the rupture disk 160 can be configured to be welded or overmolded to a housing about an opening, which will be described in more detail, below.

In the current example, the perimeter region 165 is defined between the outer perimeter 168 of the rupture disk 160 and an inner perimetric boundary 169 spaced radially inward from the outer perimeter 168. In various embodiments the inner perimetric boundary 169 of the perimeter region 165 has the same shape as the outer perimeter which is currently circular. In some other embodiments the inner perimetric boundary 169 can have a different shape than the outer perimeter 168. For example, the outer perimeter can be a circular shape, and the inner perimetric boundary can be a polygonal shape, such as depicted in FIG. 3 where the perimeter region 265 has an inner perimetric boundary 269 is pentagonal. In the example of FIG. 7A, the perimeter region 465 has an inner perimetric boundary 469 that has a rectangular shape. In the example of FIG. 7B, the perimeter region 565 has an inner perimetric boundary 569 that has a hexagonal shape. The shape of the inner perimetric boundary of the perimeter region may advantageously impact the threshold rupture pressure. For example, in some implementations, an inner perimetric boundary that is polygonal shaped may advantageously decrease the threshold rupture pressure. In some implementations, an inner perimetric boundary that has relatively sharp corners may advantageously decrease the threshold rupture pressure.

Returning again to FIGS. 1-2, in various embodiments, the rupture disk 160 has an outer dimension D of less than 60 mm, where "outer dimension" is used to mean a maximum dimension across the rupture disk such as a diagonal (for example polygonal shapes such as in FIGS. 7A and 7B) or a diameter. In some other embodiments the rupture disk 160 has an outer dimension D of greater than 70 mm, however. In some embodiments, the rupture disk has an outer dimension D of less than 50 mm or even 45 mm. In some embodiments, the rupture disk has an outer dimension D between 20 mm and 40 mm. In some embodiments, the rupture disk has an outer dimension D between 7 mm and 15 mm. In some embodiments, the rupture disk has an outer dimension D between 25 mm and 35 mm. In one particular example, the rupture disk has an outer dimension D of about 32 mm. The outer dimension D of the rupture disk can be equal to the corresponding outer dimension of each of the polymeric layer 162 and the support layer 164.

Generally, as the outer dimension of the rupture disk 160 decreases, the burst pressure increases (absent weakened regions). However, despite the relatively small size of rupture disks disclosed herein, such rupture disks have a relatively low threshold rupture pressure, which can be advantageous in various implementations. In some embodiments the rupture disk has a threshold rupture pressure of less than 10 psi, less than 7 psi, or less than 6 psi. The threshold rupture pressure can be between 4 psi and 6 psi. The threshold rupture pressure of the rupture disk be greater than 2 psi, 3 psi, or 4 psi. The threshold rupture pressure can be at room temperature (25° C.).

Figure 4:
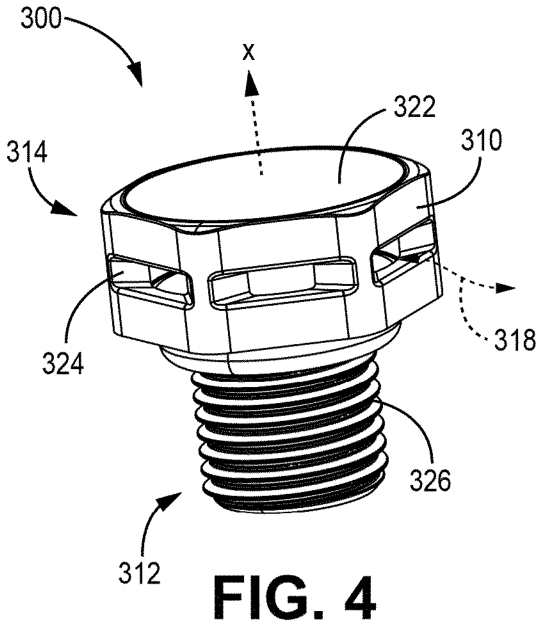
FIG. 4 depicts a perspective view of example rupture disk system consistent with various embodiments.
Figure 5:
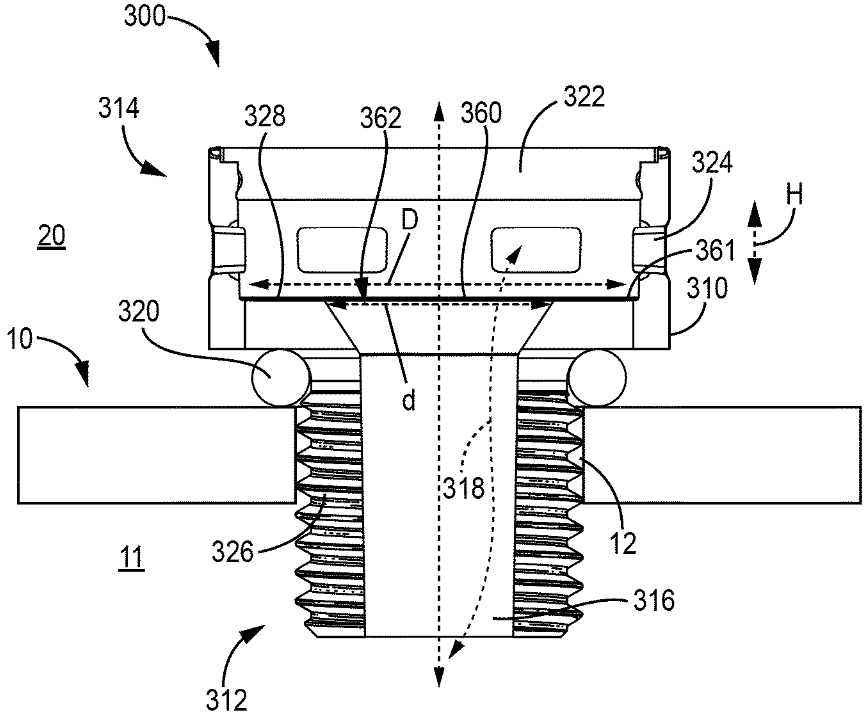
FIG. 5 depicts a cross-sectional view of the example rupture disk system of FIG. 4.
Figure 6:
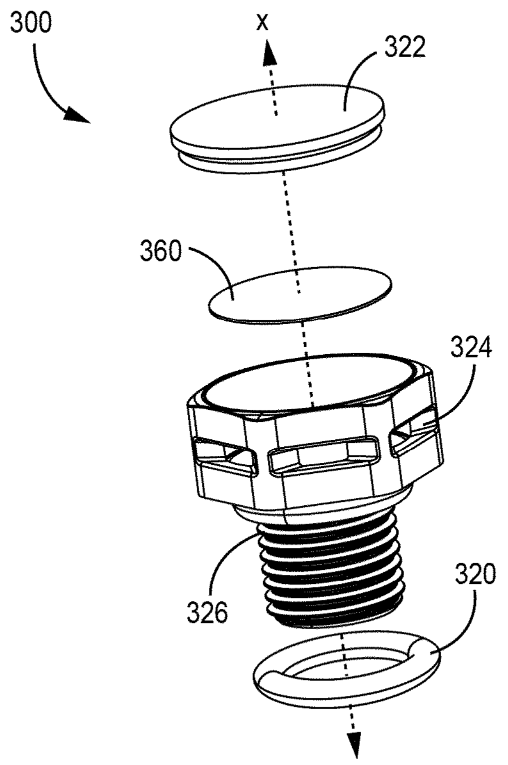
FIG. 6 depicts an exploded view of the example rupture disk system of FIG. 4.

FIG. 4 depicts a perspective view of an example rupture disk system 300 consistent with the technology disclosed herein, where the rupture disk system. FIG. 5 depicts a cross-sectional view of the example rupture disk system 300 installed in an enclosure 10. FIG. 6 depicts an exploded view of the example rupture disk system 300 of FIG. 4. The rupture disk system 300 is generally configured to allow rapid airflow out of the enclosure 10 upon a threshold rupture pressure between the interior 11 of the enclosure 10 and the outside environment 20 (FIG. 5). The rupture disk system 300 has a housing 310 and a rupture disk 360. The housing 310 defines a central axis x.

The housing 310 is generally configured to protect the rupture disk 360 from the outside environment 20 that may cause premature rupture of the rupture disk. The housing generally has a first axial end 312 and a second axial end 314. The first axial end 312 defines an axial opening 316. The axial opening 316 is generally configured to be in open communication with the interior 11 of the enclosure 10. The housing 310 has an airflow pathway 318 that generally extends from the first axial end 312 towards the second axial end 314. A sealing surface 320 is defined about the airflow pathway 318 between the first axial end 312 and the second axial end 314. The sealing surface 320 is configured to form a seal with the enclosure 10 to prevent the ingress or egress of substances relative to the enclosure 10. The sealing surface 320 can be an axial or radial seal that is configured to seal against the housing 10 about a housing opening 12 defined in the housing 10. In some embodiments, the sealing surface 320 faces towards the first axial end 312 to form an axial seal with the enclosure 10. In some embodiments, the sealing surface 320 faces radially outward and is configured to form a radial seal with the enclosure 10.

A rupture disk 360, such as a rupture disk consistent with the descriptions above, is coupled to the housing 310 across the airflow pathway 318. The rupture disk 360 obstructs the airflow pathway 318 such that the first axial end 312 of the housing 310 is separated from the second axial end 314 of the housing 310 (until the rupture disk 360 ruptures). The rupture disk 360 has a polymeric layer that can be consistent with the discussions above. In some embodiments the rupture disk 360 has a support layer disposed on a surface of the polymeric layer, consistent with discussions above.

The rupture disk 360 is generally coupled to a mounting surface 328 defined by the housing 310. The mounting surface 328 is generally planar and extends around the airflow pathway 318. The mounting surface 328 defines an opening 362 that is a portion of the airflow pathway 318. The opening in the mounting surface 328 can have an outer dimension d (such as a diagonal or a diameter) that corresponds to the size of the rupture disk 360. The outer dimension d of the opening in the mounting surface 328 is generally less than a corresponding outer dimension D of the rupture disk 360. The outer dimension d of the opening in the mounting surface 328 can be between 60% and 95% of the outer dimension D of the rupture disk 360. In some embodiments the outer dimension d of the opening ranges from 1 mm to 56 mm. In some embodiments the outer dimension d of the opening ranges from 20 mm to 40 mm. In some embodiments the outer dimension d ranges from 15 mm to 35 mm. In some embodiments the outer dimension d of the opening is at least 3 mm. In some embodiments the outer dimension d of the opening is less than 15 mm, 10 mm, or 7 mm.

In various embodiments the rupture disk 360 is coupled to the mounting surface 328 of the housing 310 through a variety of approaches known in the art. A perimeter region 361 of rupture disk 360 is coupled to the housing 310 in a region surrounding the airflow pathway 318. The rupture disk 360 and the housing 310 form an airtight seal about the airflow pathway 318. In various embodiments, the rupture disk 360 and the housing 310 form a seal that resists impingement by liquids such as water. The rupture disk 360 can be coupled to the housing 310 through the use of an adhesive, welding (heat or ultrasonic welding, as examples), over-molding, or through other approaches known in the art. In some embodiments where an adhesive is employed, the adhesive is a pressure-sensitive adhesive, such as a pressure sensitive adhesive tape. In some embodiments the adhesive is a double-sided adhesive tape. One such example is an acrylic-based pressure sensitive adhesive, such as Acrylic Adhesive 300MP from 3M™ of St. Paul, Minnesota, USA. Another such example is a silicone-based pressure sensitive adhesive. A commercially available example of a silicone-based pressure sensitive adhesive is a double-sided adhesive ARclad® 8458 from Adhesives Research® Glen Rock, Pennsylvania, USA. In some embodiments the adhesive is a curable adhesive material such as silicone-based adhesive. In some embodiments the polymeric layer (162, FIG. 2) of the rupture disk 360 is configured to be welded to the housing 310 across the airflow pathway 318.

The housing has a shield 322 that extends across the airflow pathway 318 on the second axial end 314 of the housing 310. The shield 322 is generally configured to obstruct direct impact between elements in the outside environment and the rupture disk 360 such as water and debris. The housing 310 defines radial openings 324 between the first axial end and the second axial end, where the airflow pathway 318 of the housing 310 extends from the axial opening to the radial openings 324. The radial openings 324 are defines around the central axis x. The airflow pathway 318 extends through the housing 310 from the axial opening 316 to the radial openings 324.

The shield 322 is generally spaced from the rupture disk 360 in the axial direction by a distance H. More particularly, the shield 322 is spaced from the rupture disk 360 at a particular axial distance H that facilitates failure of the rupture disk 360. If the shield 322 is too close to the rupture disk 360, then the shield 322 may provide structural support to the rupture disk 360 and impede failure of the rupture disk 360. If the shield 322 is too far from the rupture disk 360, then the system 300 may be too large to accommodate certain operating environments. Incorporating a weakened region, discussed above, in the rupture disk 360 may advantageously allow for a relative reduction in the axial distance H between the shield 322 and the rupture disk 360 while maintaining a predictable failure rate. Reducing the axial distance H between the shield 322 and the rupture disk 360 may advantageously reduce the footprint of the system 300 to accommodate smaller operating environments. In some embodiments, the shield 322 is spaced 4 mm to 15 mm, 5 mm to 10 mm, or 5 mm to 8 mm in the axial direction from the rupture disk 360. In some other embodiments, the shield 322 is at least 10 mm or 20 mm from the rupture disk 360 in the axial direction. In some embodiments, the shield 322 is no more than 70 mm, 50 mm, 40 mm, 30 mm, or 20 mm from the rupture disk 360 in the axial direction.

In the current example, the first axial end 312 of the housing 310 defines an enclosure coupling structure 326 about the airflow pathway 318. The coupling structure 326 is generally configured to couple to the enclosure 10 about the enclosure opening 12. The coupling structure 326 is generally configured to bring the sealing surface 320 into sealing engagement with the enclosure 10 about the enclosure opening 12. In the current example, the coupling structure 326 is a threaded surface configured to frictionally engage a mating threaded surface of the enclosure 10 about the enclosure opening 12. In some other embodiments, a fastening structure such as bolts, screws, or the like can be used to couple the housing 310 to the enclosure 10. In some embodiments, the fastening structure is a bayonet connector that is configured to be received by a mating connector defined by the enclosure. In such examples, the fastening structure can be configured to be mutually received by fastener openings defined by the housing 310 and aligned fastening openings of the enclosure 10. In such examples, sealing surfaces can be defined between the fastening structures and the airflow pathway 318, such as around the fastening structures.

In various embodiments, the rupture disk system 300 is configured to meet IP67 waterproofness standards when coupled to an enclosure 10 in accordance with the International Electrotechnical Commission (IEC) standard 60529.

Various approaches can be used to construct rupture disk systems consistent with the technology disclosed herein. A polymeric layer is provided. In some embodiments a support layer is applied to the polymeric layer. In various embodiments a weakened region is formed in the polymeric layer. The rupture disk is sealably coupled to a housing.

Each of the polymeric layer and the support layer (if used) can generally be consistent with corresponding components discussed above. In various embodiments the weakened region is formed in the polymeric layer after application of polymeric layer to the support layer, while in other embodiments the weakened region is formed in the polymeric layer before application of support layer to the polymeric layer. The weakened region (163, FIGS. 1-2) generally extends through a portion of the thickness of the polymeric layer (162, FIGS. 1-2) and has a width of less than 300 μm. In various embodiments the weakened region extends through a portion of the thickness of the polymeric layer to the support layer. In some embodiments the weakened region does not extend through a portion of the thickness of the support layer.

In various embodiments the weakened region is formed through a lasing operation on the polymeric layer. The polymeric layer can be lased after applying the polymeric layer to the support layer. In various embodiments the laser is relatively low powered. In various embodiments the laser has a power output of less than or equal to 45 watts.

The rupture disk is sealably coupled to a housing across an airflow pathway defined by the housing. The rupture disk can be sealably coupled to the housing via adhesive, heat welding, or the like, as has been described above. Also, as has been described above, the housing generally has a sealing surface that is configured to surround the airflow pathway, where the sealing surface is configured to form a seal between the housing and enclosure about the airflow pathway. The housing can be coupled to an enclosure via fastening structures that have been above.

STATEMENT OF THE EMBODIMENTS

Embodiment 1. A rupture disk system comprising:

a housing defining a central axis comprising:

a first axial end defining an axial opening, a second axial end, an airflow pathway extending from the first axial end towards the second axial end, a sealing surface about the airflow pathway facing towards the first axial end, a shield extending across the airflow pathway on the second axial end, and radial openings defined around the central axis, the radial openings positioned between the first axial end and the second axial end, whereby the airflow pathway extends from the axial opening to the radial openings; and a rupture disk coupled to the housing across the airflow pathway, the rupture disk comprising a polymeric layer, wherein the rupture disk has an unweakened region having a first thickness and a weakened region having a second thickness, wherein the rupture disk has a threshold rupture pressure defined by the weakened region.

Embodiment 2. The rupture disk system of any one of embodiments 1 and 3-17, wherein the polymeric layer is breathable.

Embodiment 3. The rupture disk system of any one of embodiments 1-2 and 4-17, wherein the polymeric layer is non-breathable.

Embodiment 4. The rupture disk system of any one of embodiments 1-3 and 5-17, wherein the polymeric layer comprises PTFE.

Embodiment 5. The rupture disk system of any one of embodiments 1-4 and 6-17, wherein the rupture disk has a first thickness from 0.5 mils (12.7 μm) to 10 mils (254 μm).

Embodiment 6. The rupture disk system of any one of embodiments 1-5 and 7-17, wherein the rupture disk further comprises a support layer coupled to the housing across the airflow pathway, the support layer abutting the polymeric layer.

Embodiment 7. The rupture disk system of any one of embodiments 1-6 and 8-17, wherein the support layer comprises molded plastic.

Embodiment 8. The rupture disk system of any one of embodiments 1-7 and 9-17, wherein the support layer is domed.

Embodiment 9. The rupture disk system of any one of embodiments 1-8 and 10-17, the polymeric layer comprising a carrier layer and a first adhesive disposed across a first surface of the carrier layer, wherein the first adhesive is coupled to the housing.

Embodiment 10. The rupture disk system of any one of embodiments 1-9 and 11-17, wherein the polymeric layer is heat welded to the housing in a perimeter region of the polymeric layer.

Embodiment 11. The rupture disk system of any one of embodiments 1-10 and 12-17, wherein the weakened region in the polymeric layer separates two distinct areas in the polymeric layer.

Embodiment 12. The rupture disk system of any one of embodiments 1-11 and 13-17, the rupture disk having an outer dimension of less than 50 mm.

Embodiment 13. The rupture disk of any one of embodiments 1-12 and 14-17, wherein the polymeric layer further comprises a perimeter region and a central region, the perimeter region comprising an adhesive layer disposed across a second surface of the carrier layer, wherein the central region lacks the second adhesive layer.

Embodiment 14. The rupture disk system of any one of embodiments 1-13 and 15-17, wherein the polymeric layer comprises PES.

Embodiment 15. The rupture disk system of any one of embodiments 1-14 and 16-17, wherein the polymeric layer comprises skived PTFE.

Embodiment 16. The rupture disk system of any one of embodiments 1-15 and 17, wherein the rupture disk has a first thickness ranging from 0.5 mils (12.7 μm) to 3 mils (76.2 μm).

Embodiment 17. The rupture disk system of any one of embodiments 1-16, wherein the shield is spaced no more than 10 mm from the rupture disk in an axial direction.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A rupture disk system comprising:

a housing comprising:

- a first axial end,
- a second axial end opposite the first axial end,
- an airflow pathway extending from the first axial end towards the second axial end, and
- a sealing surface about the airflow pathway facing towards the first axial end; and a rupture disk coupled to the housing across the airflow pathway, the rupture disk comprising a polymeric layer, wherein the polymeric layer is continuous and the polymeric layer has an unweakened region having a first thickness and a weakened region having a second thickness, wherein the rupture disk has a threshold rupture pressure defined by the weakened region.

2. The rupture disk system of claim 1, wherein the polymeric layer is breathable.

3. The rupture disk system of claim 1, wherein the polymeric layer comprises PTFE.

4. The rupture disk system of claim 1, wherein the polymeric layer has a first thickness from 0.5 mils (12.7 μm) to 10 mils (254 μm).

5. The rupture disk system of claim 1, wherein the polymeric layer is ultrasonically welded to the housing in a perimeter region of the polymeric layer.

6. The rupture disk system of claim 1, wherein the weakened region in the polymeric layer separates two distinct areas in the polymeric layer.

7. The rupture disk system of claim 1, the rupture disk having an outer dimension of less than 50 mm.

8. The rupture disk system of claim 1, wherein the polymeric layer comprises PES.

9. The rupture disk system of claim 1, wherein the polymeric layer comprises skived PTFE.

10. The rupture disk system of claim 1, wherein the rupture disk has a first thickness ranging from 0.5 mils (12.7 μm) to 3 mils (76.2 μm).

11. The rupture disk system of claim 1, wherein the weakened region separates portions of a single area.

12. The rupture disk system of claim 1, wherein the rupture disk lacks an adhesive layer.

13. The rupture disk system of claim 1, wherein the rupture disk lacks a support layer.

* * * * *